July 19, 1938.  S. S. GRADY  2,123,892
FOUNTAIN
Original Filed Oct. 26, 1934
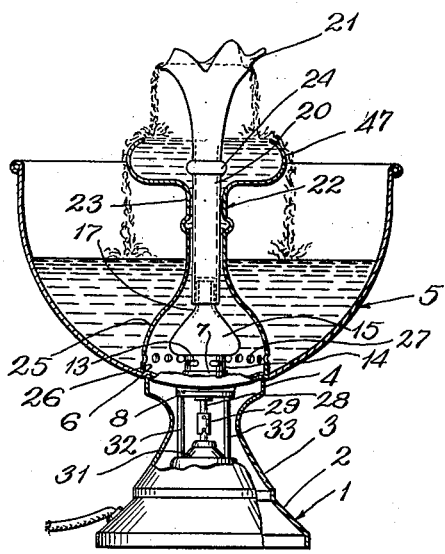
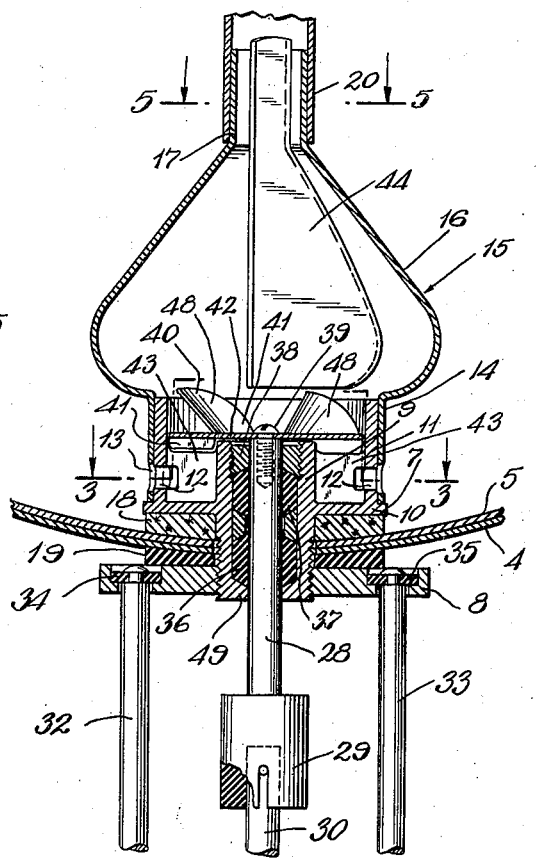
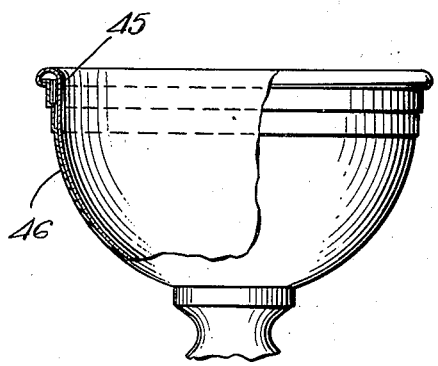
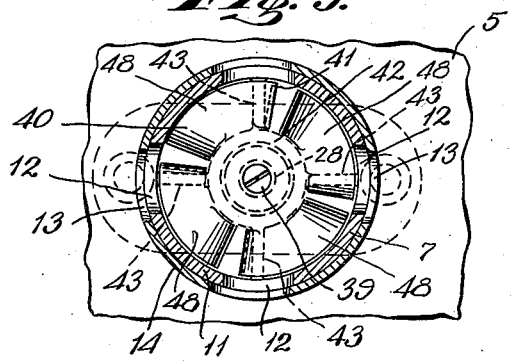
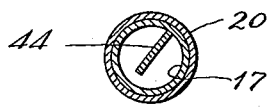
INVENTOR
STEPHEN S. GRADY
BY Gustav Drew
ATTORNEY Patented July 19, 1938

2,123,892

UNITED STATES PATENT OFFICE 2,123,892

FOUNTAIN

Stephen S. Grady, Magnolia, N. C.

Application October 26, 1934, Serial No. 750,061
Renewed October 14, 1937

13 Claims. (Cl. 299—7)

This invention relates to fountains in general and more especially to fountains for household use in association with punch bowls, fish aquariums and the like.

Among the objects of the present invention, it is aimed to provide an improved fountain for household use in association with punch bowls, fish aquariums and the like including a bowl, a fountain conduit having a discharge at the upper end thereof, a communication between the lower end of the conduit and the lower part of the bowl and a pump or liquid impeller for directing the liquid from the lower end of the bowl through the lower end of the fountain conduit and impelling it to the upper end of the conduit to be discharged from the upper end of the conduit or directly back into the bowl or else into the receiver as desired.

It is still another object of the present invention to provide in combination with one receiver, such as a bowl and another receiver, such as a fountain conduit, an improved impeller for drawing the liquid from one receiver and impelling it through the other either to be dispensed or ultimately to be returned to the first receiver.

These and other features, capabilities and advantages of the invention will appear from the subjoined detail description of specific embodiments thereof illustrated in the accompanying drawing in which Figure 1 is a side elevation of a fountain made according to the present invention partly broken away and in section;

Fig. 2 is an enlarged transverse section showing the essential parts of the impeller or pump;

Fig. 3 is a section on the line 3—3 of Fig. 2;

Fig. 4 is a fragmental side elevation of another type of bowl partly broken away; and Fig. 5 is a section on the line 5—5 of Fig. 2.

In the embodiment shown in Figs. 1 to 3 inclusive, there is shown a chambered base 1 having an enlarged tapered portion 2 at the lower end thereof and a narrower tapered portion 3 extending upwardly therefrom and terminating at its upper end in an enlarged seat forming member 4. The seat forming member 4 has an outer upwardly facing concave seat to receive the central convex lower face of the bowl 5 recessed from the lower edge 6 of such bowl 5.

In the interest of reducing the weight of the device to a minimum, most of the parts of the structure including the bowl 5 and base 1 are composed of aluminum or the like which at the same time will serve also in the interest of appearance and utility on account of its immunity to corrosion or tarnishing from atmospheric conditions or from alcoholic or acid containing liquids.

In the present instance, the bowl 5 is secured to the base 1 by a casting 7 and a nut 8, the casting 7 having an inner cylindrical portion 9, a disc 10 extending laterally therefrom and an outer cylindrical portion 11 extending upwardly from the disc portion 10, in the present instance, concentric with the cylindrical portion 9 but spaced from the outer periphery of the disc portion 10 to form a seat.

The lower end of the cylindrical portion 11, just above the disc portion 10 has a plurality of openings 12 formed therein to register with the openings 13 in the cylindrical portion 14 of the dome 15 having a dome-shaped enlargement 16 tapering inwardly in its upward extent into the diminished cylindrical portion 17.

The dome 15 has its lower edge resting on the upper face of the seat formed by the disc portion 10 outside of the cylindrical portion 11 and is rotatably mounted thereon to facilitate rotating the dome either into a position where its openings 13 will register with the openings 12 and afford the passage of liquid from the bowl into the dome or into a position where the openings 13 will not register with the openings 12 and shut off the passage of liquid from one to the other, or register only partway in order to facilitate regulation according to the speed of the motor or the like.

The cylindrical portion 9 has a portion which extends through the lower central portion of the bowl 5 and the central portion of the seat in the seat forming portion 4 and is there externally threaded to receive the internal threads of the nut 8.

Preferably as shown to form a liquid tight connection at the joint between the cylindrical portion 9 and the bowl 5 and seat forming portion 4 there is provided a washer 18 composed of cork disposed between the lower face of the disc 10 and the inner face of the bowl 5 and another washer 19 composed of a suitable resilient substance such as rubber disposed between the nut 8 and the lower face of the concave seat of the seat forming portion 4. Secured to the cylindrical portion 17 of the dome 15 and extending upwardly thereof there is provided a tubular extension 20, terminating in the present instance in an outwardly flaring ornamental portion 21 resembling a flower. The lower end of the tubular extension 20 is frictionally secured to the cylindrical portion 17 of the dome 15, fitting sufficiently tight to facilitate angular rotation of the dome 15 when rotating the tubular extension 20 but otherwise free to be removed in an axial direction when it is desired, as an instance, to clean the apparatus.

Primarily in the interest of the appearance of the article there is provided a chambered housing 22 having a narrow neck portion 23 to receive and substantially engage the outer cylindrical surface of the tubular extension 20 below the bead 24. This housing 22 has an enlarged dome shaped member 25 at its lower end preferably conforming to and engaging the inner shoulder 26 formed by the recess at the lower end of the bowl 5. To permit the liquid from the bowl 5 freely to pass through the dome 25 into position to pass through the openings 13 and 12 when in registration, there are provided a plurality of openings 27 adjacent the lower end of the dome 25.

The upper portion of the housing 20 above the neck 23 consists in an enlarged cup shaped member 47 positioned to receive when desired the discharge of the liquid from the upper end of the flower shaped portion 21 and in turn permit the overflow to pass into the bowl 5.

The mechanism provided for impelling the liquid from the bowl 5 into the fountain conduit formed by the dome 15 and tubular extension 20 consists essentially in a motor having a plurality of impelling blades 48, four in the present instance, secured to the upper end of the stem 28 connected by the yieldable clutch member 29 to the shaft 30 of the motor 31 housed in the base 1.

The motor 31 in the present instance is suspended from the outer portions of the nut 8 by the pins 32 and 33 extending upwardly from the motor casing and secured in place by the discs 34 and 35 respectively.

To provide a liquid tight connection between the cylindrical portion 9 and the stem 28, the cylindrical portion 9 is provided with an inwardly extending shoulder 49 at its lower end to receive a packing 36 above the same in the annular chamber formed between the inner face of the cylindrical portion 9 and the stem 28. Spaced from the packing 36, there is preferably provided a second packing 37 which is secured in position by the collar 38 screw threadedly connected to the upper inner end of the cylindrical portion 9.

Secured to the upper end of the stem 28 by the screw 39 and rotatably mounted on the upper edge of the cylindrical portion 9, there are provided the blades 48 consisting of an inner disc portion 42 having integrally therewith the wing portions 40 extending upwardly therefrom and the wing portions 41 extending downwardly therefrom.

To prevent the liquid received in the chamber formed above the disc portion 10 between the cylindrical portions 9 and 11 from rotating or swirling around and thus interfering with the upward movement thereof, there are provided a plurality of radially extending baffle plates 43 extending from the cylindrical portion 9 to the cylindrical portion 11 preferably adjacent to the openings 12 as indicated in Fig. 3.

In turn to prevent the liquid from swirling around in the dome 14 and thus interfering with the upward movement thereof, there is provided the baffle plate 44 which extends down from the cylindrical portion 17 into the dome shaped portion 16.

In the modification shown in Fig. 4, the bowl there provided consists of two shells, an inner shell 45 preferably composed of brass which is secured to an outer shell 46 preferably composed of aluminum. It has been found that aluminum does not form a good base for chromium plating whereas brass of course does form a good base for such plating. With the embodiment illustrated in Fig. 4, the inner face of the brass shell 45 may be chromium plated and the outer shell 46 composed of aluminum coated with any desirable colored coating.

It is of course also obvious that the bowl 5 may be made of glass especially when intended for use as a fish aquarium. The housing 22 may likewise be made of glass when intended for such use. On the other hand, as aforesaid, in the interest of maintaining the weight of the device to a minimum, it may be desirable to produce the base 1, bowl 5, housing 22 and tubular extension 20 all of aluminum.

In the operation of the device, it is of course obvious that the liquid from the bowl 5 will be drawn in through the openings 27 and then through the openings 13 and 12 when in registration with one another, there to be impelled upwardly by the impellers 48 into the interior of the dome 15 and by the upward pressure produced by the impellers 48 impelled upwardly through the tubular extension 20 to be discharged from the upper end of the flower-shaped portion 21 to flow into the shell formed by the cup shaped member 47 and then overflow back into the bowl 5.

It is obvious that various changes and modifications may be made to the details of construction without departing from the general spirit of the invention as set forth in the appended claims.

I claim:

1. The combination with a bowl for liquid, of a fountain conduit extending upwardly from the bottom of said bowl, said conduit having an opening at the lower end thereof and a discharge at the upper end thereof, a collar fixed to said bowl having an opening, said conduit being rotatable to move its opening into variable registration with the opening in said collar, and a pump associated with said fountain conduit to direct the liquid from said bowl through said conduit to the discharge at the upper end of said conduit there to return to said bowl.

2. The combination with a bowl for liquid, of a fountain conduit extending upwardly from the bottom of said bowl, said conduit having a plurality of openings at the lower end thereof and an outwardly flaring flower shaped discharge at the upper end thereof, a collar fixed to said bowl having an opening, said conduit being rotatable to move its opening into variable registration with the opening in said collar, and a pump associated with said fountain conduit to direct the liquid from said bowl through said conduit to the discharge at the upper end of said conduit there to return to the bowl.

3. The combination with a chambered base, of a bowl suported by said base, a chambered bracket extending through the bottom of said bowl and the upper end of said base, means for securing said bracket, bowl and base to one another, said bracket having a centrally disposed vertically extending inner cylindrical wall extending from said bowl into said base, said bracket also having a horizontally extending disc disposed inside of said bowl and a large cylindrical wall extending up from said disc and spaced from the edge thereof and from said inner cylindrical wall, there being openings at the lower end of said large cylindrical wall, a fountain conduit operatively associated with said large cylindrical wall and having a discharge at the upper end thereof, there being openings in said conduit, said conduit being rotatable to move its openings into and out of registration with the openings in said bracket, a motor supported in said base, and a plurality of impellers rotatably mounted in said bracket and operatively connected to said motor to direct the liquid from said bowl through said openings into said conduit and up to said discharge there to return to said bowl.

4. The combination with a chambered base, of a bowl supported by said base, a chambered bracket extending through the bottom of said bowl and the upper end of said base, means for securing said bracket, bowl and base to one another, said bracket having a centrally disposed vertically extending inner cylindrical wall extending from said bowl into said base, said bracket also having a horizontally extending disc disposed inside of said bowl and a large cylindrical wall extending up from said disc and spaced from the edge thereof and from said inner cylindrical wall, there being openings at the lower end of said large cylindrical wall, a fountain conduit rotatably mounted on the part of said disc extending beyond said large cylindrical wall and having a discharge at the upper end thereof, the lower end of said conduit conforming to said large cylindrical wall to form a substantially liquid tight fit and having openings therein adapted to register with the openings in said large cylindrical wall to afford communication between said bowl and said fountain conduit and in turn to be moved to one side to shut off or vary the extent of communication between said bowl and said fountain conduit, a motor supported in said base, and a plurality of impellers rotatably mounted in said bracket and operatively connected to said motor to direct the liquid from said bowl through said openings when in registration with one another into said conduit up to said discharge there to return to said bowl.

5. The combination with a chambered base, of a bowl supported by said base, a chambered bracket extending through the bottom of said bowl and the upper end of said base, means for securing said bracket, bowl and base to one another, said bracket having a centrally disposed vertically extending inner cylindrical wall extending from said bowl into said base, said bracket also having a horizontally extending disc disposed inside of said bowl and a large cylindrical wall extending up from said disc and spaced from the edge thereof and from said inner cylindrical wall, there being openings at the lower end of said large cylindrical wall, a fountain conduit operatively associated with said large cylindrical wall and having a discharge at the upper end thereof, said fountain conduit having an intermediate outwardly bulging portion disposed a short distance above said openings, a motor supported in said base, a plurality of impellers rotatably mounted in said bracket and operatively connected to said motor to direct the liquid from said bowl through said openings into said conduit up to said discharge there to return to said bowl, and baffle plates in the chamber formed between said cylindrical walls and in said bulging portion so positioned as to insure upward movement of the liquid.

6. The combination with a chambered base, of a bowl supported by said base, a chambered bracket extending through the bottom of said bowl and the upper end of said base, means for securing said bracket, bowl and base to one another, said bracket having a centrally disposed vertically extending inner cylindrical wall extending from said bowl into said base, said bracket also having a horizontally extending disc disposed inside of said bowl and a large cylindrical wall extending up from said disc and spaced from the edge thereof and from said inner cylindrical wall, there being openings at the lower end of said large cylindrical wall, a fountain conduit operatively associated with said large cylindrical wall and having a discharge at the upper end thereof, said fountain conduit consisting of an upper and a lower part, the lower part having a sleeve provided with openings fitting said large cylindrical wall and an outwardly bulging portion disposed a short distance above said openings, the upper part being connected to the upper end of said lower part to rotate with said lower part relative to said large cylindrical wall to facilitate registering the openings of said lower part with the openings of said large cylindrical wall at one time and at another time to bring them out of registration and thus shut off or vary the extent of communication from said bowl to the interior of said fountain conduit, a motor supported in said base, and a plurality of impellers rotatably mounted in said bracket and operatively connected to said motor to direct the liquid from said bowl through said openings into said conduit up to said discharge there to return to said bowl.

7. The combination with a chambered base, of a bowl supported by said base, a chambered bracket having a laterally extending shoulder and extending through the bottom of said bowl and the upper end of said base, a nut screw threadedly connected to the portion of said bracket extending into said base, flexible washers interposed between said bowl and the shoulder of said bracket and between said base and said nut whereby tightening of said nut will tend to force said washers into liquid tight relation with said bowl and base, said bracket having a centrally disposed vertically extending inner cylindrical wall extending from said bowl into said base, said bracket also having a horizontally extending disc disposed inside of said bowl and a large cylindrical wall extending up from said disc and spaced from the edge thereof and from said inner cylindrical wall, there being openings at the lower end of said large cylindrical wall, a fountain conduit operatively associated with said large cylindrical wall and having a discharge at the upper end thereof, a motor supported in said base, and a plurality of impellers rotatably mounted in said bracket and operatively connected to said motor to direct the liquid from said bowl through said openings into said conduit up to said discharge there to return to said bowl.

8. The combination with a chambered base, of a bowl supported by said base, a chambered bracket extending through the bottom of said bowl and the upper end of said base, a nut screw threadedly connected to the portion of said bracket extending into said base to secure said bracket, bowl and base to one another, said bracket having a centrally disposed vertically extending inner cylindrical wall extending from said bowl into said base, said bracket also having a horizontally extending disc disposed inside of said bowl and a large cylindrical wall extending up from said disc and spaced from the edge thereof and from said inner cylindrical wall, there being openings at the lower end of said large cylindrical wall, a fountain conduit operatively associated with said large cylindrical wall and having a discharge at the upper end thereof, a motor, rods connecting said motor to said nut inside of said base, a plurality of impellers rotatably mounted in said bracket, and a shaft extending down from said impellers through said inner cylindrical wall and operatively connected to said motor to direct the liquid from said bowl through said openings into said conduit up to said discharge there to return to said bowl.

9. The combination with a chambered base, of a bowl supported by said base, a chambered bracket extending through the bottom of said bowl and the upper end of said base, a nut screw threadedly connected to the portion of said bracket extending into said base to secure said bracket, bowl and base to one another, said bracket having a centrally disposed vertically extending inner cylindrical wall extending from said wall into said base, said bracket also having a horizontally extending disc disposed inside of said bowl and a large cylindrical wall extending up from said disc and spaced from the edge thereof and from said inner cylindrical wall, there being openings at the lower end of said large cylindrical wall, a fountain conduit operatively associated with said large cylindrical wall and having a discharge at the upper end thereof, a motor, rods connecting said motor to said nut inside of said base, and a one-piece impeller blade member having a plurality of impeller blades formed thereon with large upwardly inclined portions and short downwardly inclined portions, said impeller blade member being rotatably mounted in said bracket and operatively connected to said motor to direct the liquid from said bowl through said openings into said conduit and up to said discharge there to return to said bowl.

10. The combination with a chambered base, of a bowl supported by said base, a chambered bracket extending through the bottom of said bowl and the upper end of said base, means for securing said bracket, bowl and base to one another, said bracket having a centrally disposed vertically extending inner cylindrical wall extending from said bowl into said base, said bracket also having a horizontally extending disc disposed inside of said bowl and a large cylindrical wall extending up from said disc and spaced from the edge thereof and from said inner cylindrical wall, there being openings at the ends of said large cylindrical wall, a fountain conduit operatively associated with said large cylindrical wall and having a discharge at the upper end thereof, a motor supported in said base, a plurality of impellers rotatably mounted in said bracket and operatively connected to said motor to direct the liquid from said bowl through said openings into said conduit up to said discharge there to return to said bowl, and an intermediate housing having a narrow intermediate neck conforming to and snugly fitting the fountain conduit, said housing also having at its lower end an enlarged bell shaped skirt resting on the bottom of said bowl and having openings at the lower end of said bowl to afford communication from said bowl to the interior of said housing, said housing also having a cup shaped enlargement at its upper end to receive the liquid discharging from the upper end of said fountain conduit and permit overflow back into said bowl.

11. The combination with a bowl for liquid having an upwardly extending partition with an opening therein to separate the bowl into two communicating liquid reservoirs, of a fountain conduit extending upwardly from said bowl, said conduit having a passage at the lower end thereof and a discharge at the upper end thereof, said conduit being positioned in operative relation to said partition and movable to actuate its opening into variable registration with the opening in said partition, and a pump associated with said fountain conduit to direct the liquid from said bowl through said conduit to the discharge at the upper end of said conduit there to return to said bowl.

12. The combination with a bowl for liquid having an upwardly extending annular partition with an opening therein to separate the bowl into two communicating liquid reservoirs, of a fountain conduit extending upwardly from said bowl with its lower end concentric to and adjacent to said annular partition, said conduit having a passage at the lower end thereof and a discharge at the upper end thereof, said conduit being movable to actuate its opening into variable registration with the opening in said partition, and a pump associated with said fountain conduit to direct the liquid from said bowl through said conduit to the discharge at the upper end of said conduit there to return to said bowl.

13. The combination with a base, of a bowl supported by said base, a fountain conduit extending upwardly from the bottom of said bowl, said conduit having a liquid inlet at the lower end thereof and a discharge at the upper end thereof, a motor supported in said base, a liquid-tight journal extending from said base up to the interior of said bowl, a shaft drivingly connected to said motor extending up through said journal to a point below the liquid level in said bowl, and a pump impeller blade secured to the upper end of said shaft below the liquid level in said bowl to direct the liquid from said bowl through said conduit to the discharge at the upper end of said conduit there to return to said bowl.

STEPHEN S. GRADY.